US007880812B2

(12) United States Patent  
Tani (10) Patent No.: US 7,880,812 B2  
(45) Date of Patent: Feb. 1, 2011

(54) VIDEO APPARATUS AND VIDEO PROCESSING METHOD

(75) Inventor: Tadashi Tani, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 1139 days.

(21) Appl. No.: 11/583,730

(22) Filed: Oct. 20, 2006

(65) Prior Publication Data

US 2007/0132881 A1 Jun. 14, 2007

(30) Foreign Application Priority Data

Dec. 14, 2005 (JP) ............................. 2005-360222

(51) Int. Cl.
 *H04N 5/46* (2006.01)
 *H04N 7/01* (2006.01)
(52) U.S. Cl. ...................... 348/558; 348/441
(58) Field of Classification Search ................ 348/553, 348/554, 558, 500, 525, 529, 530, 531, 540, 348/547, 441, 458, 459; H04N 7/01, 5/44, H04N 3/27, 5/46, 5/04, 5/08, 5/10
 See application file for complete search history.

(56) References Cited

U.S. PATENT DOCUMENTS

| 5,021,887 | A | * | 6/1991 | Park ........................... 348/559 |
| 5,737,036 | A | * | 4/1998 | Kanai et al. ................. 348/742 |
| 7,508,355 | B2 | | 3/2009 | Tseng et al. |
| 2007/0070202 | A1 | | 3/2007 | Kataoka |

FOREIGN PATENT DOCUMENTS

| JP | 07-212616 | 8/1995 |
| JP | 08-116470 | 5/1996 |
| JP | 09-224217 | 8/1997 |
| JP | 9-247531 | 9/1997 |
| JP | 10-333627 | 12/1998 |
| JP | 11-015428 | 1/1999 |
| JP | 2001-324952 | 11/2001 |
| JP | 2002-135681 | 5/2002 |
| JP | 2002-189465 | 7/2002 |
| JP | 2006-189742 | 7/2006 |
| JP | 2007-96875 | 4/2007 |

OTHER PUBLICATIONS

Japanese Office Action dated May 19, 2010 with partial English-language translation.

* cited by examiner

*Primary Examiner*—Sherrie Hsia  
(74) *Attorney, Agent, or Firm*—McGinn IP Law Group, PLLC (57) ABSTRACT

A video apparatus includes a processor for processing a video signal included in an input signal, a detector for detecting a vertical synchronizing interval of a synchronizing signal included in the input signal, a data saver for saving data for each vertical resolution of the video signal, the data being set in the processor for processing the video signal of the vertical resolution, and a controller for reading data from the data saver depending on the vertical resolution of the video signal, setting the read data in the processor, deriving a horizontal resolution of the video signal based on the vertical synchronizing interval detected by the detector, and changing the data set in the processor based on the derived horizontal resolution.

22 Claims, 8 Drawing Sheets

| vertical resolution | horizontal resolution | | | |
|---|---|---|---|---|
| 480 | 640 | 768 | 848 | — |
| 600 | 800 | 960 | 1064 | — |
| 720 | — | — | 1280 | — |
| 768 | 1024 | 1224 | 1360 | — |
| 960 | 1280 | 1536 | 1704 | — |
| 1024 | — | — | — | — |
| 1050 | 1400 | 1680 | 1864 | — |
| 1080 | — | 1728 | 1920 | — |
| 1200 | 1600 | 1920 | 2128 | — |
| 1440 | 1920 | 2304 | 2560 | 1280 |
| 1536 | 2048 | 2456 | 2728 | — |
| 1920 | 2560 | 3072 | 3408 | — |
| 2400 | 3200 | 3840 | 4264 | — |
| 2880 | 3840 | 4608 | 5120 | — |

↑ set data of this horizontal resolution are saved in data saver

VIDEO APPARATUS AND VIDEO PROCESSING METHOD

This application is based upon and claims the benefit of priority from Japanese Patent Application No. 2005-360222 filed on Dec. 14, 2005, the content of which is incorporated herein by reference.

BACKGROUND OF THE INVENTION

1. Field of the Invention

The present invention relates to a video apparatus and a video processing method.

2. Description of the Related Art

Figure 1:
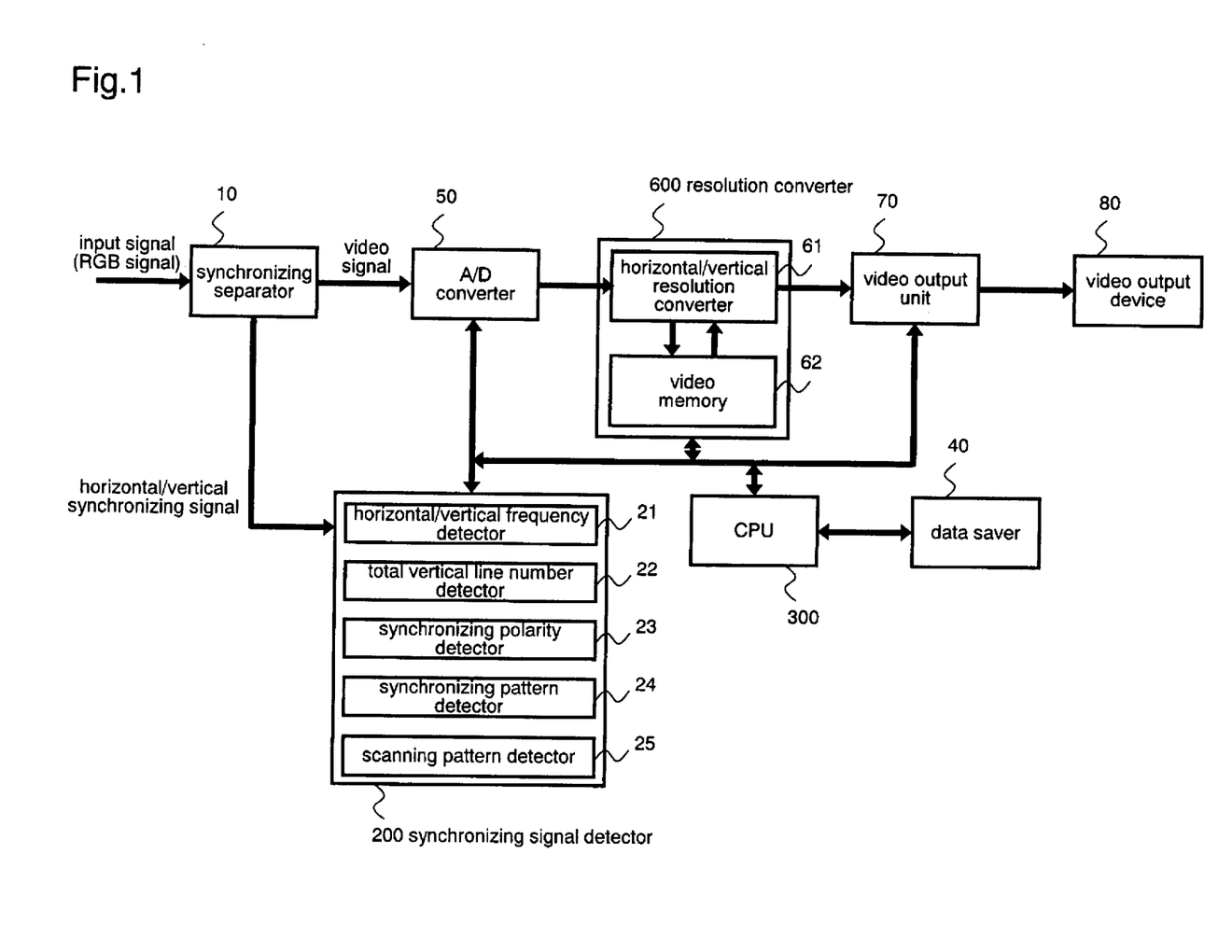
FIG. 1 is a block diagram of an arrangement of a related video apparatus.

Heretofore, there have been known video apparatus for switching between different video processing processes to display a video image depending on the type of video signal included in an input signal (e.g., see JP-A No. 10-333627). FIG. 1 shows in block form a general arrangement of a related video apparatus. The related video apparatus is supplied with an RGB signal as an input signal that includes three image signals, i.e., R (red), G (green), and B (blue) signals, and two synchronizing signals, i.e., a horizontal synchronizing signal and a vertical synchronizing signal.

As shown in FIG. 1, the related video apparatus has synchronizing separator 10, synchronizing signal detector 200, CPU 300, data saver 40, A/D converter 50, resolution converter 600, video output unit 70, and video output device 80.

Synchronizing separator 10 separates an RGB signal input from a personal computer or the like into a video signal and a synchronizing signal, outputs the video signal to AND converter 50 and the synchronizing signal to synchronizing signal detector 200.

Synchronizing signal detector 200 has horizontal/vertical frequency detector 21, total vertical line number detector 22, synchronizing polarity detector 23, synchronizing pattern detector 24, and scanning pattern detector 25.

Horizontal/vertical frequency detector 21 detects a horizontal synchronizing frequency and a vertical synchronizing frequency from the synchronizing signal, and sends the horizontal synchronizing frequency and the vertical synchronizing frequency which are detected to CPU 300.

Total vertical line number detector 22 detects the total number of vertical lines of the input signal from the synchronizing signal, and sends the detected total number of vertical lines to CPU 300.

Synchronizing polarity detector 23 detects the synchronizing polarities (positive or negative) of a horizontal synchronizing signal and a vertical synchronizing signal, respectively, from the synchronizing signal, and sends the detected synchronizing polarities to CPU 300.

Synchronizing pattern detector 24 detects a synchronizing pattern from the synchronizing signal, and sends the detected synchronizing pattern to CPU 300. There are four synchronizing patterns, i.e., "Sep", "Mix", "G-Sync", and "Tri".

The synchronizing pattern "Sep" is a pattern in which a horizontal synchronizing signal and a vertical synchronizing signal are input separately from a video signal. According to the synchronizing pattern "Sep", five signal lines are required to receive input signals, i.e., two synchronizing signals and three image signals including R, G, B signals.

The synchronizing pattern "Mix" is a pattern in which a single synchronizing signal comprising a mixture of horizontal and vertical synchronizing signals is input separately from a video signal. According to the synchronizing pattern "Mix", four signal lines are required to receive input signals.

The synchronizing pattern "G-Sync" is a pattern in which a synchronizing signal mixed with a G signal is input. According to the synchronizing pattern "G-Sync", three signal lines are required to receive three image signals including R, G, B signals.

The synchronizing pattern "Tri" is a pattern classified as a type of "G-Sync" in which a synchronizing signal is of three values. According to the synchronizing pattern "Tri", three signal lines are required to receive three image signals including R, G, B signals as with the synchronizing pattern "G-Sync".

Scanning pattern detector 25 detects a scanning pattern (Interlace or Non-Interlace) from the synchronizing signal, and sends the detected scanning pattern to CPU 300.

Data saver 40 saves data necessary for performing a video processing process depending on the detected results from synchronizing signal detector 200. CPU 300 reads data depending on the detected results from synchronizing signal detector 200, from data saver 40.

Data saver 40 also saves a horizontal resolution and a vertical resolution of a video signal which are estimated based on the detected results from synchronizing signal detector 200. Furthermore, data saver 40 saves setting data for storing a video signal of the estimated horizontal resolution and the estimated vertical resolution into video memory 62 at predetermined horizontal and vertical writing intervals, and for reading the video signal from the video memory 62 at a predetermined reading interval.

For example, setting data to be set in resolution converter 600 represent the horizontal and vertical writing intervals and the reading interval at which the video signal is stored in and read from video memory 62, and horizontal/vertical resolution conversion ratios of horizontal/vertical resolution converter 61 for storing the video signal into video memory 62 at the horizontal and vertical writing intervals. Setting data to be set in A/D converter 50 represent the number of samples of video signal that are to be stored into video memory 62 at the horizontal and vertical writing intervals.

CPU 300 determines a general memory area of data saver 40 based on the total number of vertical lines of the input signal, and also determines a detailed memory area of data saver 40 based on the horizontal synchronizing frequency of the horizontal synchronizing signal. Since the data saved in the memory area are data depending on the vertical resolution of the video signals, CPU 300 reads the saved data.

As described above, the memory area of data saver 40 is divided based on the total number of vertical lines and the horizontal synchronizing frequency. However, the memory area may be divided into a more detailed area using the vertical synchronizing frequency, the synchronizing polarities, the synchronizing pattern, and the scanning pattern as additional information.

CPU 300 sets the number of samples read from data saver 40 in A/D converter 50 in order to write a video signal into video memory 62 at the horizontal/vertical writing intervals read from data saver 40.

CPU 300 also sets the horizontal/vertical writing intervals and the reading interval read from data saver 40 in horizontal/vertical resolution converter 61 of resolution converter 600. Furthermore, CPU 300 sets the horizontal/vertical resolution conversion ratios read from data saver 40 in horizontal/vertical resolution converter 61 in order to write a video signal into video memory 62 at the horizontal/vertical writing intervals that have been set.

A/D converter 50 samples a video signal according to the number of samples set by CPU 300, converts the sampled video signal into a digital video signal, and outputs the digital video signal to resolution converter 600.

Resolution converter 600 has horizontal/vertical resolution converter 61 and video memory 62.

Horizontal/vertical resolution converter 61 converts the horizontal/vertical resolutions of the video signal at the horizontal/vertical resolution conversion ratios set by CPU 300, and writes and saves the resolution-converted video signal in video memory 62. The time at which to read the video signal from video memory 62 is adjusted by CPU 300 depending on the time at which a video image is output from video output device 80.

When the time comes at which to read the video signal from video memory 62, horizontal/vertical resolution converter 61 reads the video signal from video memory 62 at the reading interval set by CPU 300. The video signal read from video memory 62 is output from horizontal/vertical resolution converter 61 to video output unit 70.

Video output unit 70 outputs a video image based on the video signal output from resolution converter 600, to video output device 80. Video output device 80 projects the video image output from video output unit 70 onto a screen with light emitted from a projection light source (not shown).

A video processing performed by the related video apparatus shown in FIG. 1 will be described below with reference to FIG. 2.

Figure 2:
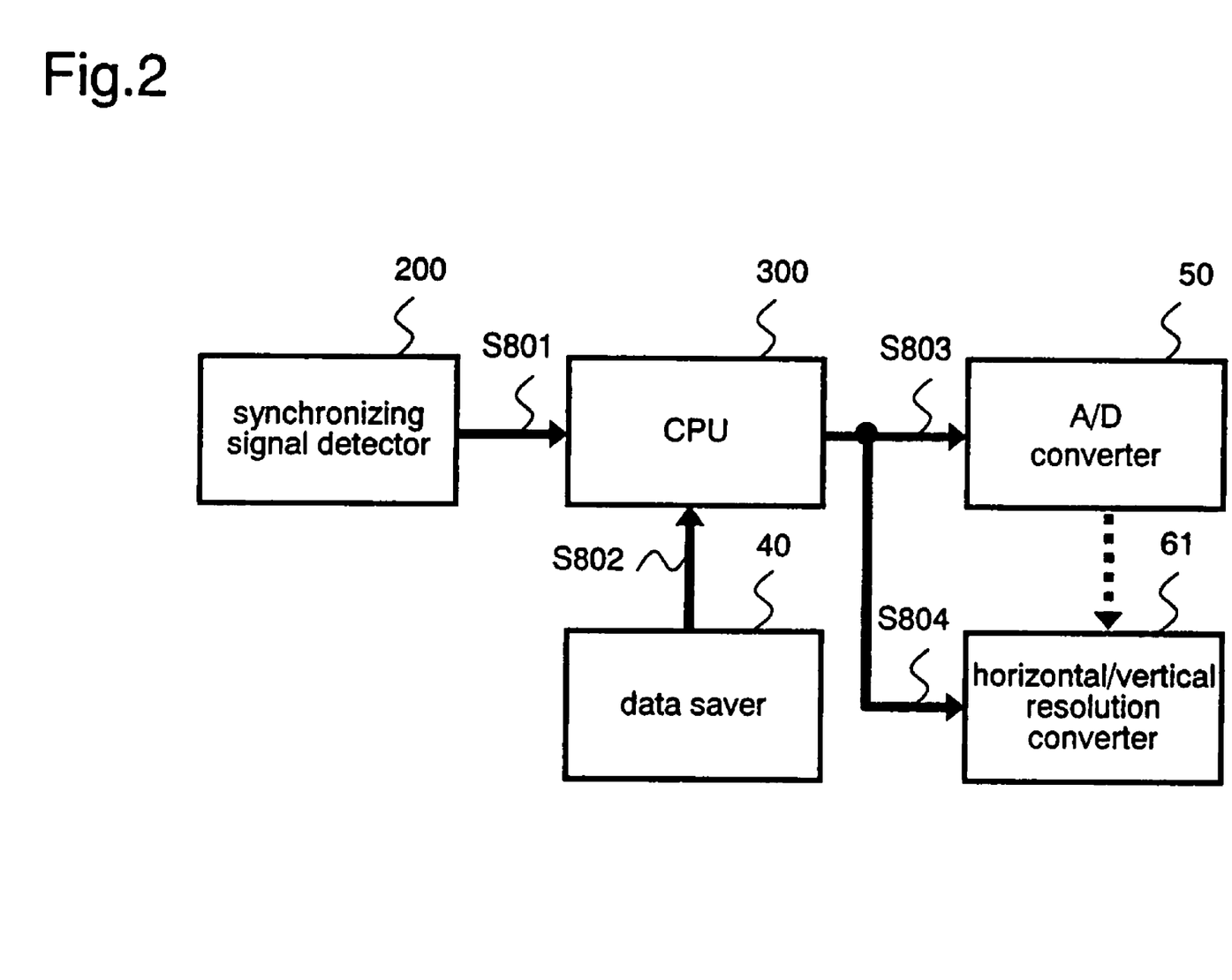
FIG. 2 is a diagram showing a video processing performed by the video apparatus shown in FIG. 1.

As shown in FIG. 2, synchronizing signal detector 200 sends at least the total number of vertical lines and a horizontal synchronizing frequency which have been detected thereby, to CPU 300, in step 801.

In step 802, CPU 300 reads data depending on the vertical resolution of the video signal from data saver 40, using at least the total number of vertical lines and the horizontal synchronizing frequency which have been sent from synchronizing signal detector 200. Specifically, if the vertical resolution of the video signal is 768, then CPU 300 reads an estimated horizontal resolution of 1024 and an estimated vertical resolution of 768, and also reads set data in conformity with the estimated horizontal resolution of 1024 and the estimated vertical resolution of 768.

In step 803, CPU 300 sets the number of samples that have been read as set data from data saver 40, in A/D converter 50. In step 804, CPU 300 sets the horizontal/vertical writing intervals, the reading interval, and the horizontal/vertical resolution conversion ratios which have been read as set data from data saver 40, in horizontal/vertical resolution converter 61.

Subsequently, A/D converter 50 samples the video signal according to the number of samples set by CPU 300, and converts the sampled video signal into a digital video signal. Horizontal/vertical resolution converter 61 converts the horizontal/vertical resolutions of the video signal at the horizontal/vertical resolution conversion ratios set by CPU 300, and saves the resolution-converted video signal in video memory 62. Thereafter, the video signal stored in video memory 62 is read at a time adjusted by CPU 300, and a video image based on the video signal is output from video output unit 70 to video output device 80.

An exemplary problem of the conventional apparatus and methods is that some video signals have the same vertical resolution, but have different horizontal resolutions. For example, some video signals have a common vertical resolution of 768, but have various horizontal resolutions of 1024, 1224, 1280, and 1360. Since it is generally difficult to distinguish between video signals which have the same vertical resolution, but have different horizontal resolutions, the operator is required to manually switch between such video signals. To handle such a plurality of video signals, data saver 40 should have data saving areas for saving signals of the different horizontal resolutions.

The related video apparatus shown in FIG. 1 is unable to appropriately process video signals which have the same vertical resolution, but have different horizontal resolutions.

For example, if a video signal has a horizontal resolution of 1360 and a vertical resolution of 768, then since CPU 300 sets the number of samples for A/D converter 50 so that it can process a video signal having a horizontal resolution of 1024 and a vertical resolution of 768, the sampling process performed by A/D converter 50 reduces an amount of video signal data. The lack of video signal data results in a different aspect ratio, making it impossible to display a proper video image. Therefore, the operator must manually reselect data from data saver 40 while viewing the displayed image. In addition, data saver 40 is required to have an increased storage capacity for handling video signals which have the same vertical resolution, but have different horizontal resolutions.

SUMMARY OF THE INVENTION

Figure 3:
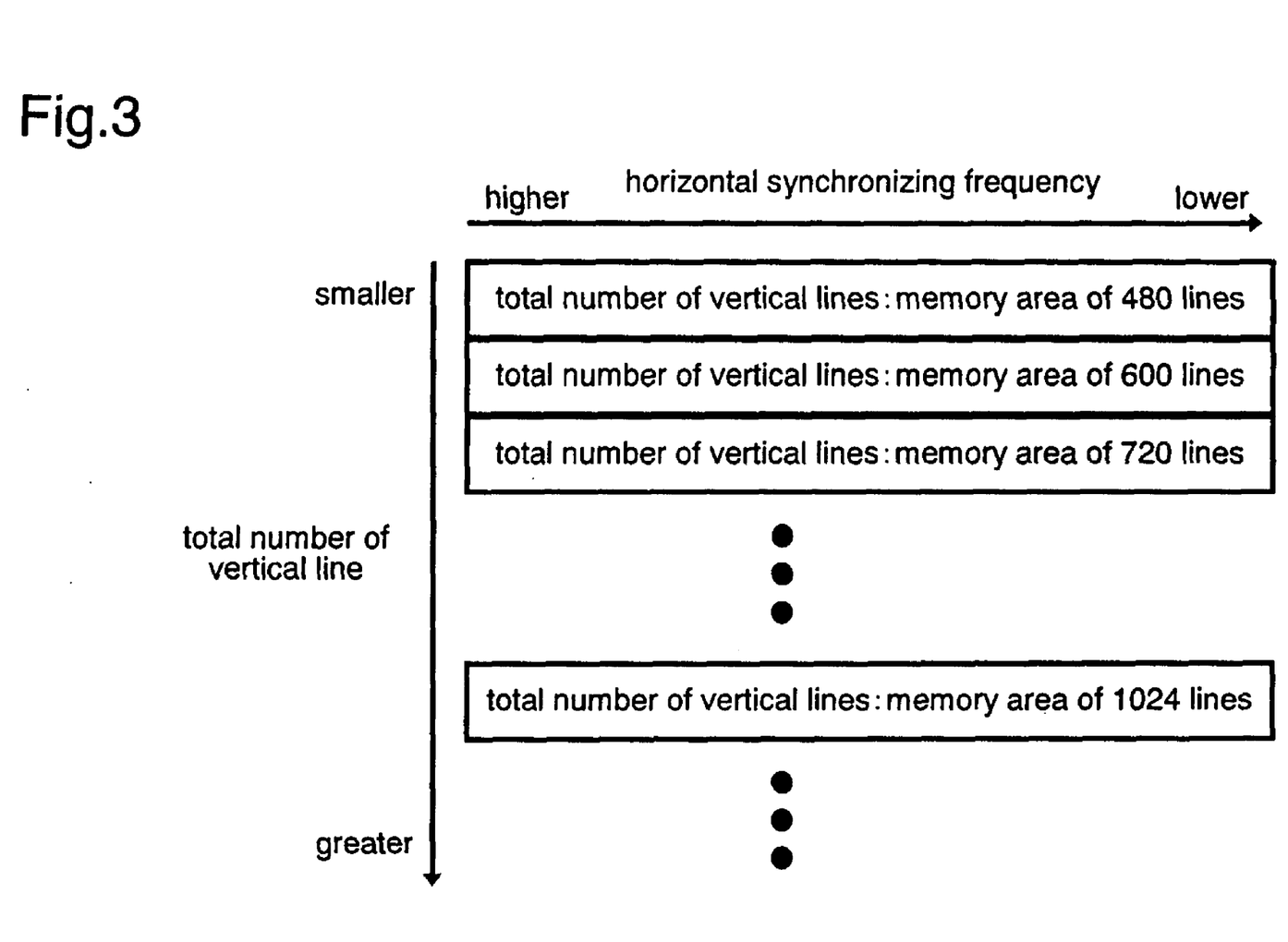
FIG. 3 is a diagram showing memory areas of a data saver 40 shown in FIG. 1.

In view of the foregoing and other exemplary problems, drawbacks, and disadvantages of the conventional apparatus and methods, it is an exemplary feature of the present invention to provide a video apparatus and a video processing method which, based on the fact that video signals having the same vertical resolution and different horizontal resolutions have essentially the same total number of vertical lines of an input signal and also have essentially the same horizontal synchronizing frequency of a horizontal synchronizing signal, divide the storage area of a data saver 40 into general memory areas depending on the total number of vertical lines, then further divide them into detailed memory areas depending on the horizontal synchronizing frequency, as shown in FIG. 3, and save data in the divided memory areas, so that common data will be stored per vertical resolution, thereby reducing the storage capacity of the data saver 40, and a reduction (or absence) of video signal data will be prevented from occurring due to a video signal sampling process.

To achieve the above and other exemplary features, a video apparatus according to the present invention includes a processor to process a video signal included in an input signal, a detector to detect a vertical synchronizing interval of a synchronizing signal included in the input signal, a data saver to save data for each vertical resolution of the video signal, the data being set in the processor for processing the video signal of the vertical resolution, and a controller to read data from the data saver depending on the vertical resolution of the video signal, set the read data in the processor, derive a horizontal resolution of the video signal based on the vertical synchronizing interval detected by the detector, and change the data set in the processor based on the derived horizontal resolution.

Specifically, the processor comprises an A/D converter to sample and convert the video signal into a digital video signal, and a horizontal/vertical resolution converter to convert the horizontal/vertical resolutions of the digital video signal from the A/D converter and write the resolution-converted video signal into a video memory. The data saver saves, as the data, the number of samples to be set in the A/D converter and horizontal/vertical resolution conversion ratios to be set in the horizontal/vertical resolution converter, in order to write the video signal into the video memory at predetermined horizontal/vertical writing intervals. The controller sets the number of samples and the horizontal/vertical resolution conversion ratios read from the data saver respectively in the A/D converter and the horizontal/vertical resolution converter, and thereafter changes the number of samples to be set in the A/D converter so that the video signal will be sampled at the derived horizontal resolution.

With the above arrangement, since the horizontal resolution of the video signal is derived based on the vertical synchronizing interval of the synchronizing signal, and the number of samples to be set in the A/D converter is changed so that the video signal will be sampled at the derived horizontal resolution, the A/D converter can fully sample the video signal according to the horizontal resolution. Therefore, a reduction (or lack) of video signal data is prevented from occurring.

The processor further comprises a horizontal resolution converter disposed between the A/D converter and the horizontal/vertical resolution converter, to convert the horizontal resolution of the digital video signal from the AND converter and output the resolution-converted video signal to the horizontal/vertical resolution converter. The controller derives a horizontal resolution conversion ratio for the horizontal resolution converter based on the vertical synchronizing interval detected by the detector such that the digital video signal from the A/D converter will be written into the video memory at the predetermined horizontal/vertical writing intervals, and sets the derived horizontal resolution conversion ratio in the horizontal resolution converter.

With the above arrangement, the horizontal resolution of the video signal is converted by the horizontal resolution converter such that the video signal which has been sampled according to the changed number of samples and converted into a digital video signal by the A/D converter will be written into the video memory at the predetermined horizontal/vertical writing intervals. Even when the horizontal/vertical resolution converter at a subsequent stage converts the horizontal/vertical resolutions of the video signal in the same manner as heretofore, the video signal can be written into the video memory at the predetermined horizontal/vertical writing intervals that are saved in the data saver. Therefore, the storage capacity of the video memory can be reduced, and the data for vertical resolutions that are saved in the data saver can continuously be used.

The above and other exemplary features, and advantages of the present invention will become apparent from the following description with reference to the accompanying drawings which illustrate examples of the present invention.

DESCRIPTION OF THE EXEMPLARY EMBODIMENTS

An exemplary embodiment of the present invention will be described below with reference to the drawings.

Figure 4:
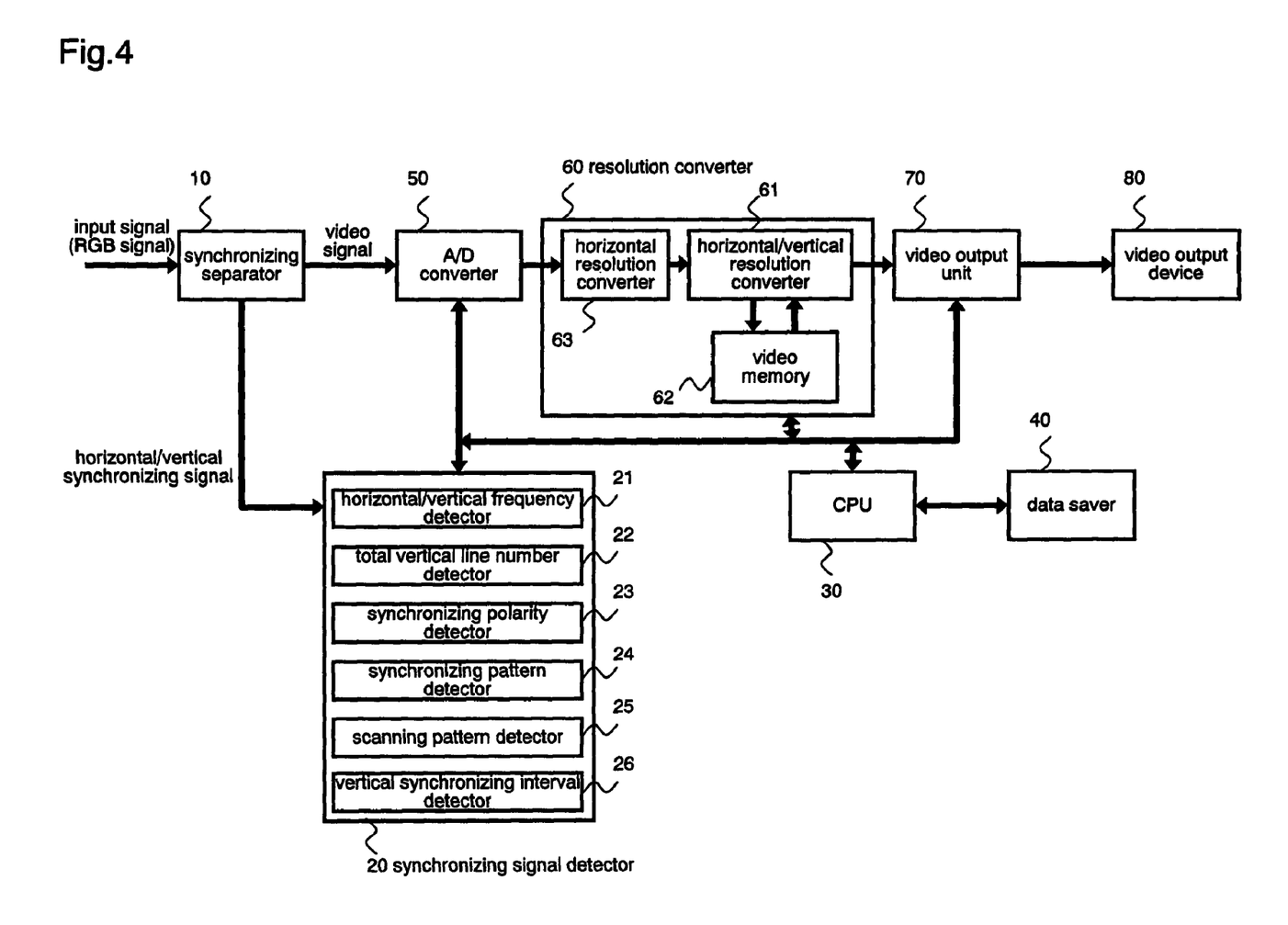
FIG. 4 is a block diagram of an arrangement of a video apparatus according to an exemplary embodiment of the present invention.

FIG. 4 shows in block form an arrangement of a video apparatus according to an exemplary embodiment of the present invention. Those parts of FIG. 4 which are identical to those shown in FIG. 1 will be denoted by identical reference characters in FIG. 4.

As shown in FIG. 4, the video apparatus according to the present exemplary embodiment is similar to the related video apparatus shown in FIG. 1 except that it has synchronizing signal detector 20, CPU 30, and resolution converter 60, instead of synchronizing signal detector 200, CPU 300, and resolution converter 600 shown in FIG. 1.

Synchronizing signal generator 20 differs from synchronizing signal detector 200 shown in FIG. 1 in that it additionally has vertical synchronizing interval detector 26. Resolution converter 60 differs from resolution converter 600 shown in FIG. 1 in that it additionally has horizontal resolution converter 63. Other parts of the video apparatus according to the present exemplary embodiment are identical to those of the related video apparatus shown in FIG. 1.

A/D converter 50 and resolution converter 60 serve as an example of a processor. CPU 30 serves as a controller.

Figure 5:
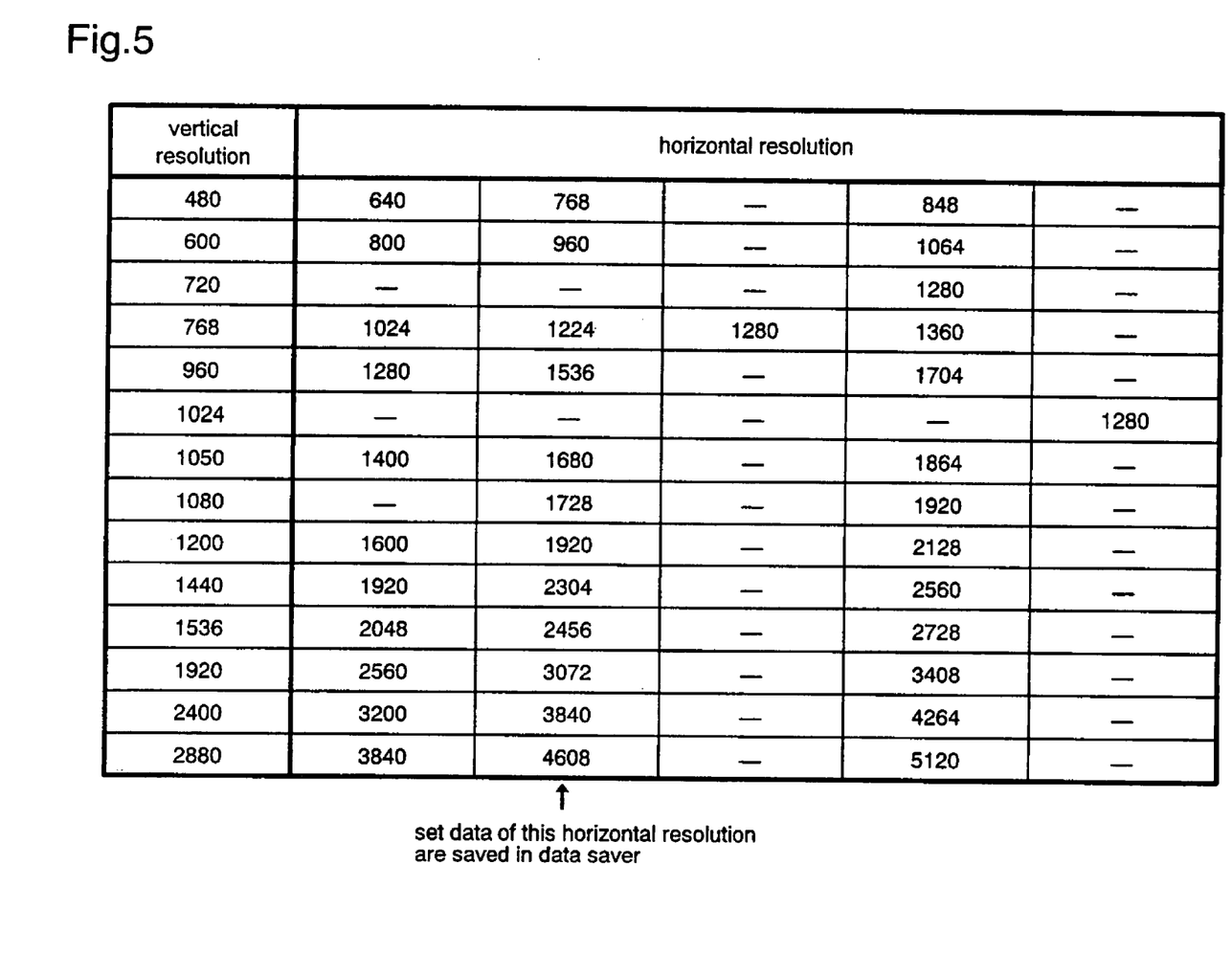
FIG. 5 is a table showing the manner in which data are stored in a data saver 40 shown in FIG. 4 for respective vertical resolutions.

The present exemplary embodiment is based on the fact that, as shown in FIG. 5, video signals which have vertical resolution, but have different horizontal resolutions can be classified for respective horizontal resolutions depending on the vertical synchronizing interval of the vertical synchronizing signal, and resides in changed processing details of synchronizing signal detector 20, CPU 30, and resolution converter 60.

Details of the video apparatus according to the present exemplary embodiment which are different from those of the related video apparatus shown in FIG. 1 will mainly be described below.

Vertical synchronizing interval detector 26 detects a vertical synchronizing interval, which represents the interval from a leading edge to a trailing edge of the vertical synchronizing signal, from the vertical synchronizing signal, and sends the detected vertical synchronizing interval to CPU 30.

Horizontal resolution converter 63 converts the horizontal resolution of the video signal. According to the present exemplary embodiment, it is assumed that horizontal resolution converter 63 is capable of converting the horizontal resolution of the video signal at horizontal resolution conversion ratios of 1/1, 3/4, 5/6, and 4/5. Obviously, other horizontal resolution conversion ratios could be employed as would be known by one of ordinary skill in the art after taking the present application as a whole.

Based on the detected results from synchronizing signal detector 20, CPU 30 reads data depending on the vertical resolution of the video signal from data saver 40, and makes settings in A/D converter 50 and horizontal/vertical resolution converter 61. Specifically, CPU 30 sets horizontal/vertical writing intervals at which to write the video signal into video memory 62 and a reading interval at which to read the video signal from video memory 62, and horizontal/vertical resolution conversion ratios for writing the video signal into video memory 62 at the horizontal/vertical writing intervals, in horizontal/vertical resolution converter 61. CPU 30 also sets the number of samples of the video signal for writing the video signal into video memory 62 at the horizontal/vertical writing intervals, in A/D converter 50.

Data saver 40 saves common data irrespective of the horizontal resolution of the video signal, with respect to the respective vertical resolutions of the video signal. Specifically, minimum horizontal resolutions in the leftmost column of a table shown in FIG. 5 are saved as estimated horizontal resolutions with respect to the respective vertical resolutions, and set data in conformity with the estimated horizontal resolutions. Therefore, even when a video signal whose horizontal resolution is not the same as any of the horizontal resolutions in the leftmost column shown in FIG. 5 is input to the video apparatus, A/D converter 50 performs its sampling process to process video signals having the minimum horizontal resolutions in the leftmost column shown in FIG. 5. As a result, a lack of video signal data occurs.

According to the present exemplary embodiment, CPU 30 derives an actual horizontal resolution of the video signal based on the vertical synchronizing interval sent from synchronizing signal detector 20, as a target horizontal resolution, and changes the number of samples set in A/D converter 50 so that A/D converter 50 will sample the video signal in accordance with the target horizontal resolution.

Since A/D converter 50 can now fully sample the video signal according to the actual horizontal resolution thereof, a reduction (or lack) of video signal data is prevented from occurring.

However, when the number of samples set in A/D converter 50 is changed as described above, the video signal cannot be written into video memory 62 at the horizontal/vertical writing intervals (horizontal/vertical writing intervals matching the minimum horizontal resolution) saved in data saver 40, and the storage capacity of video memory 62 cannot be reduced.

According to the present exemplary embodiment, horizontal resolution converter 63 which precedes horizontal/vertical resolution converter 61 converts the horizontal resolution of the video signal such that the video signal which has been sampled according to the changed number of samples and converted into a digital video signal by A/D converter 50 will be written into video memory 62 at the horizontal/vertical writing intervals saved in data saver 40.

Specifically, CPU 30 derives a horizontal resolution conversion ratio for horizontal resolution converter 63 based on the vertical synchronizing interval sent from synchronizing signal detector 20 such that the video signal which has been sampled according to the changed number of samples and converted into a digital video signal by A/D converter 50 will be written into video memory 62 at the horizontal/vertical writing intervals, and sets the derived horizontal resolution conversion ratio in horizontal resolution converter 63. Horizontal resolution converter 63 converts the horizontal resolution of the video signal at the horizontal resolution conversion ratio set by CPU 30.

Consequently, even when horizontal/vertical resolution converter 61 which follows horizontal resolution converter 63 converts the horizontal/vertical resolutions in the same manner as heretofore, the video signal can be written into video memory 62 at the horizontal/vertical writing intervals saved in data saver 40. Therefore, the storage capacity of video memory 62 can be reduced, and the common data for the vertical resolutions saved in data saver 40 can be used.

A video processing performed by the video apparatus according to the present exemplary embodiment shown in FIG. 4 will be described below with reference to FIG. 6.

Figure 6:
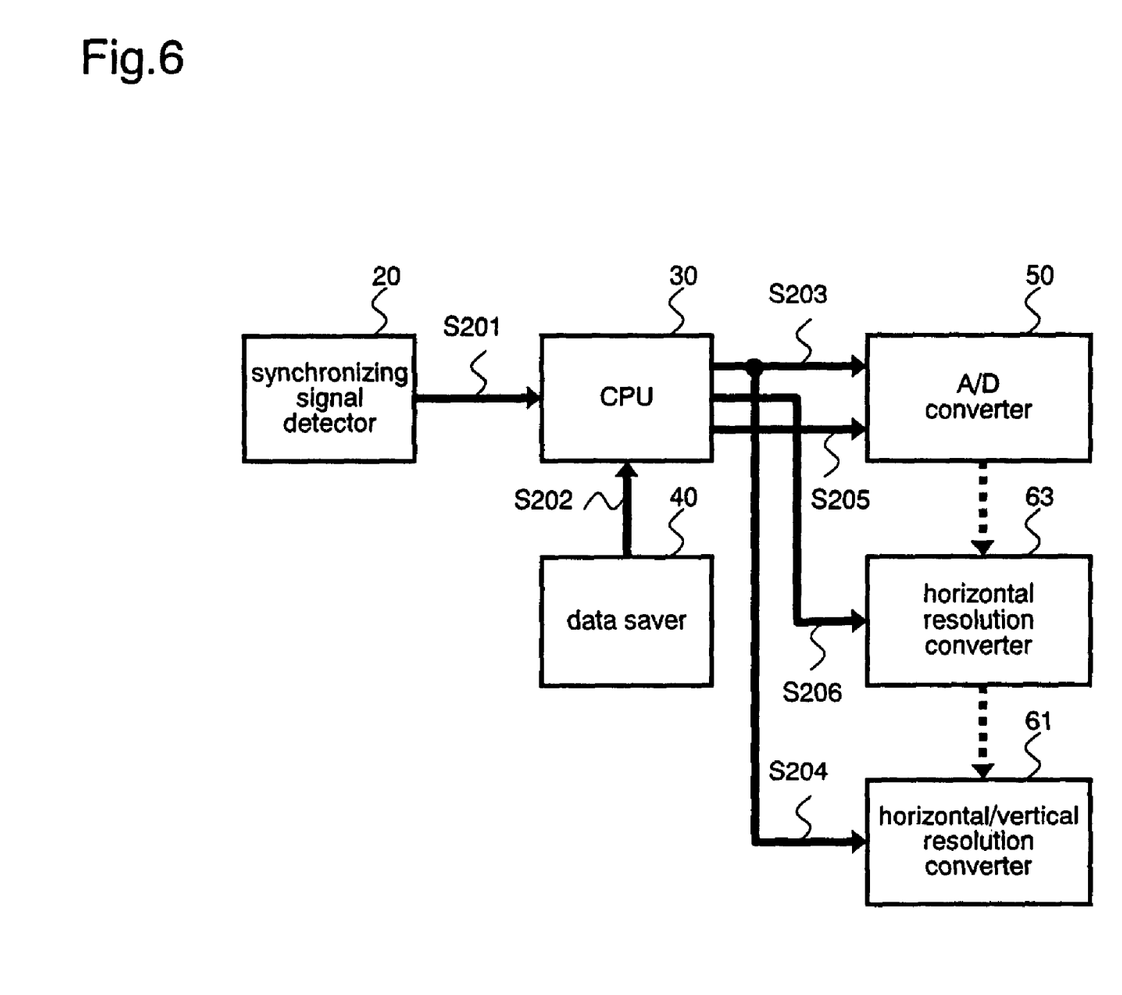
FIG. 6 is a diagram showing a video processing performed by the video apparatus shown in FIG. 4.

As shown in FIG. 6, synchronizing signal detector 20 sends at least the total number of vertical lines, a horizontal synchronizing frequency, and a vertical synchronizing interval which have been detected thereby, to CPU 30, in step 201.

In step 202, CPU 30 reads data depending on the vertical resolution of the video signal from data saver 40, using at least the total number of vertical lines and the horizontal synchronizing frequency which have been sent from synchronizing signal detector 20. Specifically, in step 202, if the vertical resolution of the video signal remains the same, then common data are read regardless of different horizontal resolutions. For example, if the vertical resolution of the video signal is 768, then CPU 30 reads an estimated horizontal resolution of 1024 and an estimated vertical resolution of 768 regardless of different horizontal resolutions of 1024, 1224, 1280, and 1360, and also reads set data in conformity with the estimated horizontal resolution of 1024 and the estimated vertical resolution of 768.

In step 203, CPU 30 sets the number of samples that have been read as set data from data saver 40, in A/D converter 50. In step 204, CPU 30 sets the horizontal/vertical writing intervals, the reading interval, and the horizontal/vertical resolution conversion ratios which have been read as set data from data saver 40, in horizontal/vertical resolution converter 61.

In step 205, CPU 30 derives a target horizontal resolution representing the actual horizontal resolution of the video signal based on the vertical synchronizing interval sent from synchronizing signal detector 20, and changes the number of samples set in A/D converter 50 such that the video signal will be sampled at the target horizontal resolution.

In step 206, CPU 30 derives a horizontal resolution conversion ratio for horizontal resolution converter 63 based on the vertical synchronizing interval sent from synchronizing signal detector 20 such that the video signal which has been sampled according to the changed number of samples and converted into a digital video signal by A/D converter 50 will be written into video memory 62 at the horizontal/vertical writing intervals saved in data saver 40.

Subsequently, A/D converter 50 samples the video signal according to the number of samples set by CPU 30, and converts the sampled video signal into a digital video signal. Horizontal resolution converter 63 converts the horizontal resolution of the video signal depending on the horizontal resolution conversion ratio set by CPU 30. Horizontal/vertical resolution converter 61 converts the horizontal/vertical resolutions of the video signal at the horizontal/vertical resolution conversion ratios set by CPU 30, and writes and saves the resolution-converted video signal in video memory 62. Subsequent operational details are the same as those of the processing sequence shown in FIG. 2, and will not be described below.

Figure 7:
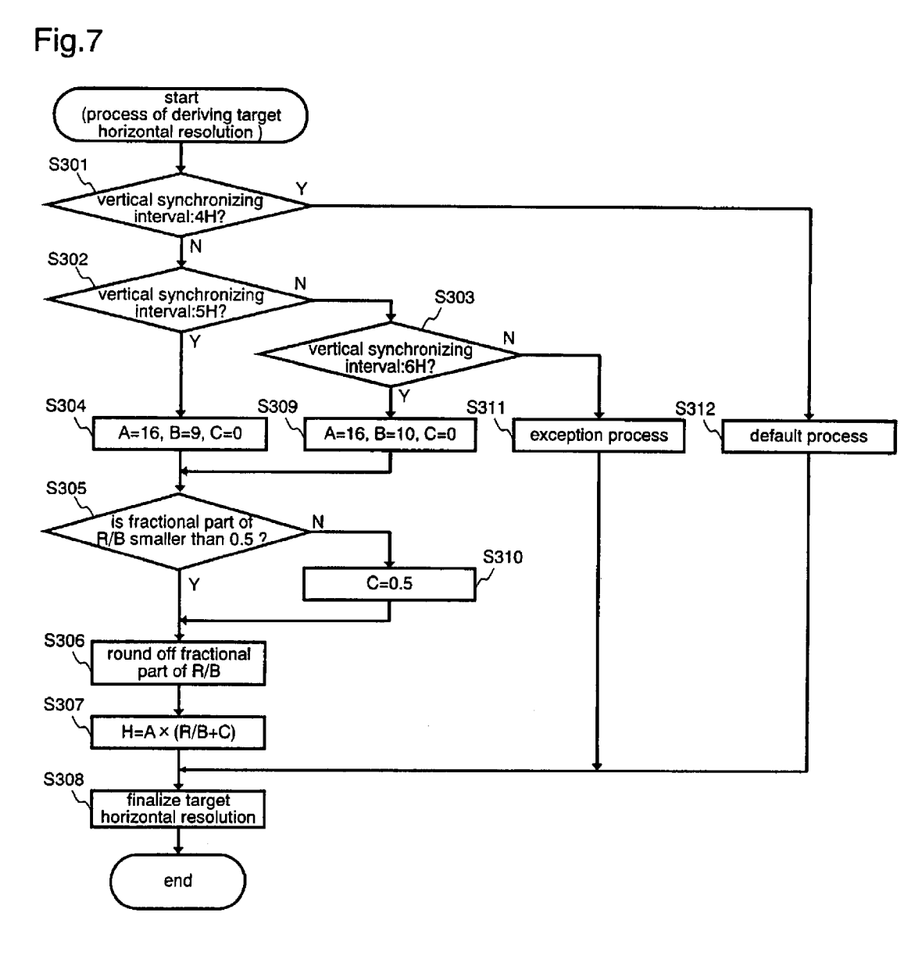
FIG. 7 is a flowchart of a process of deriving a target horizontal resolution as performed by a CPU 30 shown in FIG. 4.

A process of deriving a target horizontal resolution of the video signal will be described below with reference to FIG. 7. In FIG. 7, it is assumed that the estimated horizontal resolution read from data saver 40 by CPU 30 is 1024 and the estimated vertical resolution read from data saver 40 by CPU 30 is 768, and that the estimated horizontal resolution read from data saver 40 is represented by R, and a target horizontal resolution to be eventually derived is represented by H.

As shown in FIG. 7, CPU 30 determines the vertical synchronizing interval detected by synchronizing signal detector 20 in steps 301, 302, and 303. If the vertical synchronizing interval is represented by 4 lines, then CPU 30 executes step 312 to perform a default process. If the vertical synchronizing interval is represented by 5 lines, then CPU 30 executes step 304. If the vertical synchronizing interval is represented by 6 lines, then CPU 30 executes step 309. If the vertical synchronizing interval is not represented by 4 lines, 5 lines, or 6 lines, but is represented by 7 lines or more, then CPU 30 executes step 311 to perform an exception process.

In step 304, CPU 30 sets constants A, B, C to 16, 9, 0, respectively. Then, in step 305, CPU 30 determines whether the fractional part of the quotient (R/B) produced by dividing the estimated vertical resolution R (=768) read from data saver 40 by B (=9) is smaller than 0.5 or not. Since the fractional part is smaller than 0.5 (=0.33 . . . ) in this example, CPU 30 executes step 306. In step 306, CPU 30 rounds off the fractional part of quotient (R/B), thereby equalizing quotient (R/B) to 85. In step 307, CPU 30 puts A (=16), R/B (=85), and C (=0) into the equation: target horizontal resolution H=A× (R/B+C), thereby obtaining H=1360.

In step 309, CPU 30 sets constants A, B, C to 16, 10, 0, respectively. Then, in step 305, CPU 30 determines whether the fractional part of the quotient (R/B) produced by dividing the estimated vertical resolution R (=768) read from data saver 40 by B (=10) is smaller than 0.5 or not. Since the fractional part is greater than 0.5 (=0.8) in this example, CPU 30 executes step 310. In step 310, CPU 30 changes C to 0.5. In step 306, CPU 30 rounds off the fractional part of quotient (R/B), thereby equalizing quotient (R/B) to 76. In step 307, CPU 30 puts A (=16), R/B (=76), and C (=0.5) into the equation: target horizontal resolution H=A×(R/B+C), thereby obtaining H=1224.

In the exception process in step 311, CPU 30 sets the target horizontal resolution to H=1280, for example. In the default process in step 312, CPU 30 obtains a target horizontal resolution H=1024 which is a default value at the time the vertical resolution is 768.

Thereafter, in step 308, CPU 30 finalizes the target horizontal resolution that has been obtained in either step 304, 309, 311, or 312.

Figure 8:
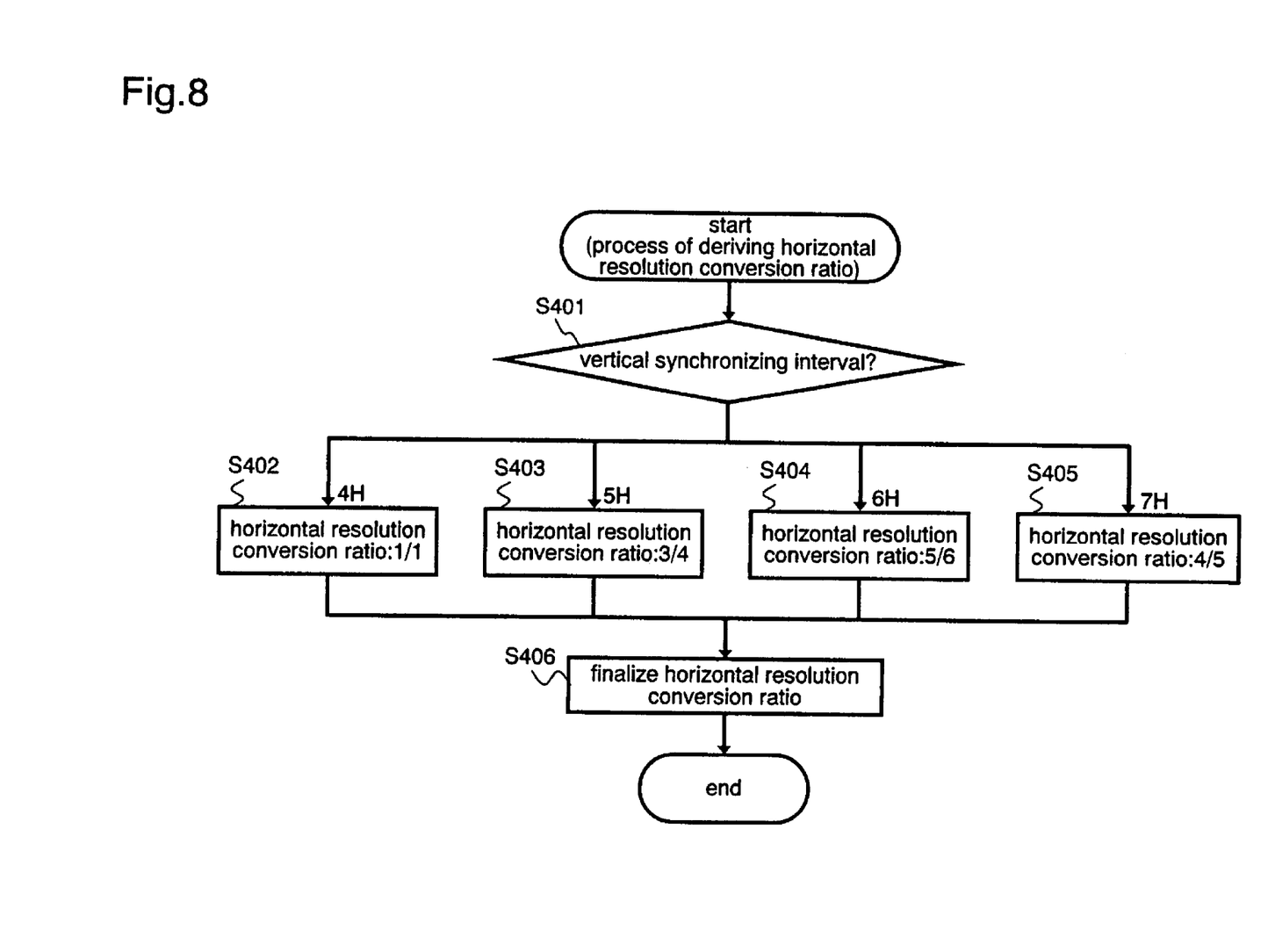
FIG. 8 is a flowchart of a process of deriving a horizontal resolution conversion ratio as performed by a CPU 30 shown in FIG. 4.

A process of deriving a horizontal resolution conversion ratio as performed by horizontal resolution converter 63 will be described below with reference to FIG. 8. In FIG. 8, it is assumed that the estimated horizontal resolution read from data saver 40 by CPU 30 is 1024 and the estimated vertical resolution read from data saver 40 by CPU 30 is 768.

As shown in FIG. 8, CPU 30 determines the vertical synchronizing interval detected by synchronizing signal detector 20 in step 401. If the vertical synchronizing interval is represented by 4 lines, then CPU 30 executes step 402. If the vertical synchronizing interval is represented by 5 lines, then CPU 30 executes step 403. If the vertical synchronizing interval is represented by 6 lines, then CPU 30 executes step 404. If the vertical synchronizing interval is represented by 7 lines or more, then CPU 30 executes step 405.

In step 402, CPU 30 obtains a horizontal resolution conversion ratio of 1/1 because the vertical synchronizing interval is represented by 4 lines. In step 403; CPU 30 obtains a horizontal resolution conversion ratio of 3/4 because the vertical synchronizing interval is represented by 5 lines. In step 404, CPU 30 obtains a horizontal resolution conversion ratio of 5/6 because the vertical synchronizing interval is represented by 6 lines. In step 405, CPU 30 obtains a horizontal resolution conversion ratio of 4/5 because the vertical synchronizing interval is represented by 7 lines or more.

Thereafter, in step 406, CPU 30 finalizes the horizontal resolution conversion ratio that has been obtained in either step 402, 403, 404, or 405.

According to the present exemplary embodiment, as described above, CPU 30 derives an actual horizontal resolution of the video signal based on the vertical synchronizing interval sent from synchronizing signal detector 20, as a target horizontal resolution, and changes the number of samples set in A/D converter 50 so that A/D converter 50 will sample the video signal in accordance with the target horizontal resolution.

Since A/D converter 50 can now fully sample the video signal according to the actual horizontal resolution thereof, a reduction (or lack) of video signal data is prevented from occurring.

According to the present exemplary embodiment, furthermore, CPU 30 derives a horizontal resolution conversion ratio for horizontal resolution converter 63 based on the vertical synchronizing interval sent from synchronizing signal detector 20 such that the video signal which has been sampled according to the changed number of samples and converted into a digital video signal by A/D converter 50, will be written into video memory 62 at the horizontal/vertical writing intervals saved in data saver 40 CPU 30 also sets the derived horizontal resolution conversion ratio in horizontal resolution converter 63. Horizontal resolution converter 63 converts the horizontal resolution of the video signal at the horizontal resolution conversion ratio set by CPU 30.

Consequently, even when horizontal/vertical resolution converter 61 which follows horizontal resolution converter 63 converts the horizontal/vertical resolutions in the same manner as heretofore, the video signal can be written into video memory 62 at the horizontal/vertical writing intervals saved in data saver 40. Therefore, the storage capacity of video memory 62 can be reduced, and the common data for the vertical resolutions saved in data saver 40 can be used.

While exemplary embodiments of the present invention have been described using specific terms, such description is for illustrative purposes only, and it is to be understood that changes and variations may be made without departing from the spirit or scope of the following claims.

Further, it is noted that, Applicant's intent is to encompass equivalents of all claim elements, even if amended later during prosecution.

What is claimed is:

1. A video apparatus, comprising:
   a processor to process a video signal included in an input signal;
   a detector to detect a vertical synchronizing interval of a synchronizing signal included in said input signal;
   a data saver to save data for each vertical resolution of said video signal, said data being set in said processor for processing the video signal of said vertical resolution; and
   a controller to read data from said data saver depending on the vertical resolution of said video signal, set the read data in said processor, derive a horizontal resolution of said video signal based on the vertical synchronizing interval detected by said detector, and change the data set in said processor based on the derived horizontal resolution.

2. A video apparatus according to claim 1, wherein said processor comprises:
   an analog-to-digital (A/D) converter to sample and convert said video signal into a digital video signal; and
   a horizontal/vertical resolution converter to convert horizontal/vertical resolutions of the digital video signal from said A/D converter and write the resolution-converted video signal into a video memory;
   wherein said data saver saves, as said data, a number of samples to be set in said A/D converter and horizontal/vertical resolution conversion ratios to be set in said horizontal/vertical resolution converter, to write said video signal into said video memory at predetermined horizontal/vertical writing intervals; and wherein said controller sets the number of samples and the horizontal/vertical resolution conversion ratios read from said data saver respectively in said A/D converter and said horizontal/vertical resolution converter, and changes the number of samples to be set in said A/D converter so that the video signal is sampled at the derived horizontal resolution.

3. A video apparatus according to claim 2, wherein said processor further comprises:

a horizontal resolution converter disposed between said A/D converter and said horizontal/vertical resolution converter, to convert the horizontal resolution of the digital video signal from said A/D converter and output the resolution-converted video signal to said horizontal/vertical resolution converter; and wherein said controller derives a horizontal resolution conversion ratio for said horizontal resolution converter based on the vertical synchronizing interval detected by said detector such that the digital video signal from said A/D converter is written into the video memory at said predetermined horizontal/vertical writing intervals, and sets the derived horizontal resolution conversion ratio in said horizontal resolution converter.

4. A video apparatus according to claim 1, wherein said detector detects a total number of vertical lines of said input signal and a horizontal synchronizing frequency of said synchronizing signal; and wherein said controller reads data depending on the vertical resolution of said video signal from said data saver based on the total number of vertical lines and the horizontal synchronizing frequency which have been detected by said detector.

5. A video apparatus according to claim 1, wherein a number of samples set in the processor is adjustable so that the video signal is sampled at the derived horizontal resolution.

6. A video apparatus according to claim 1, wherein the processor fully samples the video signal according to the derived horizontal resolution.

7. A video apparatus according to claim 1, wherein the vertical synchronizing interval comprises an interval from a leading edge to a trailing edge of the vertical synchronizing signal.

8. A video apparatus according to claim 1, wherein the video signal is written into the video memory at the horizontal/vertical writing intervals saved in the data saver.

9. A video apparatus, comprising:

processing means for processing a video signal included in an input signal;

detecting means for detecting a vertical synchronizing interval of a synchronizing signal included in said input signal;

data saving means for saving data for each vertical resolution of said video signal, said data being set in said processing means for processing the video signal of said vertical resolution; and control means for reading data from said data saver depending on the vertical resolution of said video signal, setting the read data in said processing means, deriving a horizontal resolution of said video signal based on the vertical synchronizing interval detected by said detecting means, and changing the data set in said processing means based on the derived horizontal resolution.

10. A video apparatus according to claim 9, wherein said processing means comprises:

analog-to-digital (A/D) converting means for sampling and converting said video signal into a digital video signal; and horizontal/vertical resolution converting means for converting horizontal/vertical resolutions of the digital video signal from said A/D converting means and writing the resolution-converted video signal into a video memory;

wherein said data saving means saves, as said data, a number of samples to be set in said A/D converting means and horizontal/vertical resolution conversion ratios to be set in said horizontal/vertical resolution converting means, to write said video signal into said video memory at predetermined horizontal/vertical writing intervals; and wherein said control means sets the number of samples and the horizontal/vertical resolution conversion ratios read from said data saving means respectively in said A/D converting means and said horizontal/vertical resolution converting means, and changes the number of samples to be set in said A/D converting means so that the video signal is sampled at the derived horizontal resolution.

11. A video apparatus according to claim 10, wherein said processing means further comprises:

horizontal resolution converting means, disposed between said A/D converting means and said horizontal/vertical resolution converting means, for converting the horizontal resolution of the digital video signal from said A/D for converting means and for outputting the resolution-converted video signal to said horizontal/vertical resolution converting means; and wherein said control means derives a horizontal resolution conversion ratio for said horizontal resolution converting means based on the vertical synchronizing interval detected by said detecting means such that the digital video signal from said A/D converting means is written into the video memory at said predetermined horizontal/vertical writing intervals, and sets the derived horizontal resolution conversion ratio in said horizontal resolution converting means.

12. A video apparatus according to claim 9, wherein said detecting means detects a total number of vertical lines of said input signal and a horizontal synchronizing frequency of said synchronizing signal; and wherein said control means reads data depending on the vertical resolution of said video signal from said data saving means based on the total number of vertical lines and the horizontal synchronizing frequency which have been detected by said detecting means.

13. A video apparatus according to claim 9, wherein a number of samples set in the processing means is adjustable so that the video signal is sampled at the derived horizontal resolution.

14. A video apparatus according to claim 9, wherein the processing means fully samples the video signal according to the derived horizontal resolution.

15. A video apparatus according to claim 9, wherein the vertical synchronizing interval comprises an interval from a leading edge to a trailing edge of the vertical synchronizing signal.

16. A video apparatus according to claim 9, wherein the video signal is written into the video memory at the horizontal/vertical writing intervals saved in the data saving means.

17. A method of processing a video signal, comprising the steps of:

processing a video signal included in an input signal;

detecting a vertical synchronizing interval of a synchronizing signal included in said input signal;

saving data for each vertical resolution of said video signal in a data saver, said data being set in said step of processing for processing the video signal of said vertical resolution; and reading data from said data saver depending on the vertical resolution of said video signal, setting the read data in said step of processing, deriving a horizontal resolution of said video signal based on the detected vertical synchronizing interval, and changing the data set in said step of processing based on the derived horizontal resolution.

18. A method according to claim 17, wherein said step of processing comprises an analog-to-digital (A/D) converting step of sampling and converting said video signal into a digital video signal, and a horizontal/vertical resolution converting step of converting horizontal/vertical resolutions of the digital video signal converted at said A/D converting step and writing the resolution-converted video signal into a video memory;

wherein said step of saving data comprises the step of saving, as said data, a number of samples to be set in said A/D converting step and horizontal/vertical resolution conversion ratios to be set in said horizontal/vertical resolution converting step, to write said video signal into said video memory at predetermined horizontal/vertical writing intervals; and wherein said step of setting the read data comprises the steps of setting the number of samples and the horizontal/vertical resolution conversion ratios read from said data saver respectively in said A/D converting step and said horizontal/vertical resolution converting step, and changing the number of samples to be set in said A/D converting step so that the video signal is sampled at the derived horizontal resolution.

19. A method according to claim 18, wherein said step of processing further comprises a horizontal resolution converting step of converting the horizontal resolution of the digital video signal converted at said A/D converting step and outputting the resolution-converted video signal to said horizontal/vertical resolution converting step; and wherein said step of setting the read data comprises the steps of deriving a horizontal resolution conversion ratio for said horizontal resolution converting step based on the detected vertical synchronizing interval such that the digital video signal converted at said A/D converting step is written into the video memory at said predetermined horizontal/vertical writing intervals, and setting the derived horizontal resolution conversion ratio in said horizontal resolution converting step.

20. A method according to claim 17, wherein said step of detecting the vertical synchronizing interval comprises the step of detecting a total number of vertical lines of said input signal and a horizontal synchronizing frequency of said synchronizing signal; and wherein said step of setting the read data comprises the steps of reading data depending on the vertical resolution of said video signal from said data saver based on the total number of vertical lines and the horizontal synchronizing frequency which have been detected.

21. A method according to claim 17, wherein said step of setting the read data comprises the step of deriving the horizontal resolution H of said video signal according to $H=A\times(R/B+C)$ where R represents the vertical resolution of said video signal and A, B, C constants determined depending on the detected vertical synchronizing interval, if said detected vertical synchronizing interval corresponds to a predetermined vertical synchronizing interval.

22. A method according to claim 21, wherein said step of setting the read data comprises the step of setting the horizontal resolution H of said video signal to a predetermined horizontal resolution depending on said detected vertical synchronizing interval, if said detected vertical synchronizing interval does not correspond to the predetermined vertical synchronizing interval.

* * * * *